Figure 1:
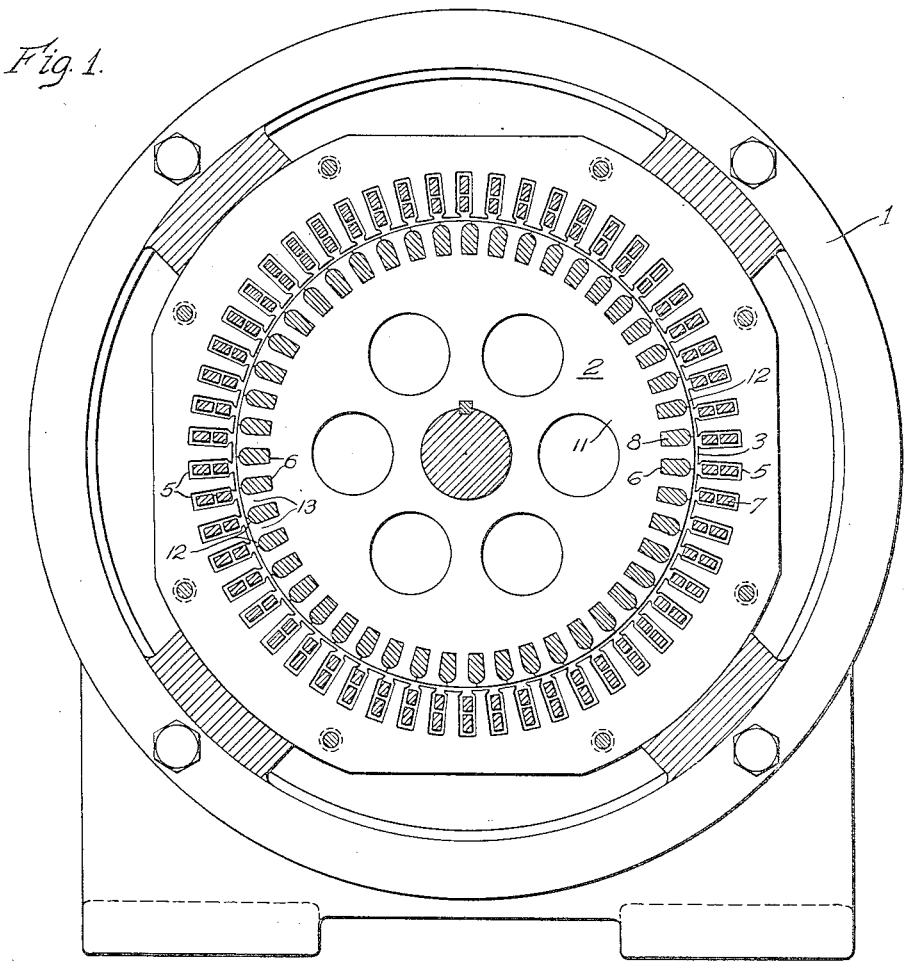

Dec. 17, 1935.   A. B. REYNDERS   2,024,745
LAMINATED PUNCHING WITH SMALL AIR GAP BETWEEN TEETH
Filed Oct. 14, 1933

WITNESSES:
C. J. Weller
Wm. C. Groome

INVENTOR
Arthur B. Reynders.
BY O. B. Buchanan
ATTORNEY

UNITED STATES PATENT OFFICE 2,024,745

LAMINATED PUNCHING WITH SMALL AIR-GAP BETWEEN TEETH

Arthur B. Reynders, Springfield, Mass., assignor to Westinghouse Electric & Manufacturing Company, East Pittsburgh, Pa., a corporation of Pennsylvania Application October 14, 1933, Serial No. 693,562

4 Claims. (Cl. 172—36)

This invention relates to a method for obtaining a small air-gap between the teeth in a laminated punching, and to the resultant magnetizable core structure which is made up from a stack of such punchings.

It is common practice, particularly in the rotor members of electrical motors, with special reference to induction motors, to utilize open slots for the winding-conductors in the magnetizable rotor core. That is, the punchings or laminations of which the core is composed are provided with perforations which are disposed near the winding-carrying periphery. The punching material between these perforations is called teeth; and these teeth are separated from each other, in such open-slot designs, by causing a narrow extension of the perforation to extend from the winding-carrying portion of the perforation to the said periphery of the punching. The advantages of this common open-slot construction is mainly the reduced slot-leakage and hence the higher torque which is obtainable, at a somewhat better power factor. There is also a reduction in that portion of the motor losses which are due to tooth-pulsation fluxes, and usually there is a slight increase in the noise of operation, due to the open-slot construction as contrasted from the closed-slot construction. All this is well known.

There are certain practical physical limitations to the dimensions obtainable in such designs, with the ordinary punch-and-die method of making punchings. The limitation which my invention overcomes is the narrowest slot which can be punched across the bridge which lies between the winding-receiving perforation and the periphery of the punching. If a die is utilized to make this slot, the narrowest slot that can be made is limited by the requirement that there must be a reasonable life of the die or tool, which limits the slot to about $\frac{1}{32}$ of an inch in width, or at the best, about 25 mils. This means that the tips of the teeth have an air-gap of at least 25 mils, or $\frac{1}{32}$ of an inch between them, with the ordinary punch-and-die method of making punchings.

In small-motor design, it is frequently found that this is a much larger air-gap between teeth than is desired, so that the electrical design has heretofore been a compromise necessitated by this limitation in the narrowest practical slot which could be obtained between the teeth.

In accordance with my invention, I do not punch the air-gap between the teeth by forcing a die through the material of the punching so as to remove a portion of the punching-material. On the contrary, I make an ordinary closed-slot punching, by punching the winding-receiving perforations so as to leave a complete magnetizable bridge over the same, between the perforations and the periphery of the punchings. I then slit the bridge-material between this perforation and the periphery of the punching. This slitting operation is merely a shearing operation resulting in a cutting of the punching-material, without removing any appreciable portion of the punching-material as is the case with the ordinary punch-and-die method in which a die is forced through the material. The punching of the perforation and the slitting can be done in a single machine-operation.

The gap between teeth can be varied to a considerable extent by skewing the teeth or bending them out of the planes of the punchings, so that the effective lengths of the toothed tips, in a circumferential direction, are reduced.

Figure 2:
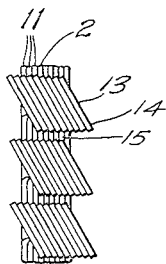
Figure 3:
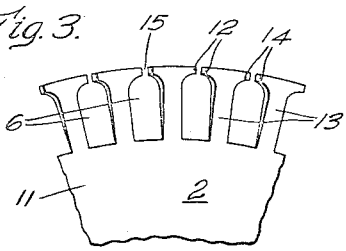

In the accompanying drawing, Figure 1 is a full-scale transverse cross-sectional view of a dynamo-electric machine having my invention applied to its rotor punchings, Fig. 2 is an enlarged fragmentary edge-view of a plurality of the rotor punchings embodying my invention, and Fig. 3 is an enlarged fragmentary end-view thereof.

The dynamo-electric machine consists of a stator 1 and a rotor 2 separated by the main air-gap 3 of the machine. The electrically operative peripheries of the stator and rotor, that is, the inner periphery of the stator and the outer periphery of the rotor, are provided with winding-receiving perforations 5 and 6, respectively, in which are disposed the stator and rotor winding-conductors 7 and 8, respectively.

In the drawing, I have illustrated my invention as being applied to the laminated magnetizable rotor core 2. This core is built up from a stack of punchings 11 having alined winding-receiving perforations 6 spaced somewhat from the winding-carrying periphery of the punchings so as to provide magnetizable bridges 12 over the winding-carrying perforations 6, that is, between said perforations and said periphery. The teeth between the perforations are designated by the numeral 13, and it will be noted that the tips of these teeth have peripheral portions 14 overhanging the perforations 6.

In accordance with my invention, the bridges 12, which are disposed between the teeth at said winding-carrying periphery of the rotor, are slit from said perforations 6 to said periphery, so that the tips of the teeth 13 are physically separated from each other, but are substantially touching each other. This produces the effect of an extremely narrow air-gap 15 between the teeth, and the width of this tooth air-gap can be considerably varied, and in general practice is increased somewhat, by skewing the teeth of the punchings, or bending the teeth out of the planes of the punchings, as shown in Fig. 2, so that the tooth air-gap 15 can have its optimum width, as desired by the electrical designer, without being limited to a minimum width of 25 mils. or $\frac{1}{32}$ of an inch.

I claim as my invention:

1. A laminated magnetizable core for a dynamo-electric machine comprising a plurality of stacked punchings having aligned perforations spaced somewhat from the winding-carrying periphery of the punchings, and having teeth between said perforations, characterized by the magnetizable bridges between the teeth at said periphery being slit from said perforations to said periphery, so as to provide separate teeth having peripheral portions overhanging said perforations, the aggregate peripheral width of all of the teeth being equal to the circumference of the winding-carrying periphery of the punchings.

2. A laminated magnetizable core for a dynamo-electric machine comprising a plurality of stacked punchings having aligned perforations spaced somewhat from the winding-carrying periphery of the punchings, and having teeth between said perforations, characterized by the magnetizable bridges between the teeth at said periphery being slit from said perforations to said periphery, so as to provide separate teeth having peripheral portions overhanging said perforations, and further characterized by said teeth being bent out of the planes of the punchings.

3. The method of making punchings for the laminated magnetizable cores of dynamo-electric machines which consists in punching perforations spaced somewhat from the winding-carrying peripheries of the punchings and slitting the material between said periphery and the several perforations.

4. The method of making punchings for the laminated magnetizable cores of dynamo-electric machines which consists in punching perforations spaced somewhat from the winding-carrying peripheries of the punchings, slitting the material between said periphery and the several perforations, and skewing the resulting teeth out of the planes of the punchings.

ARTHUR B. REYNDERS.